(12) United States Patent
Conrad

(10) Patent No.: US 9,641,371 B2
(45) Date of Patent: May 2, 2017

(54) METHODS AND SYSTEMS FOR DYNAMIC SINGLE-FREQUENCY-NETWORK-MULTICAST SYMBOL SYNCHRONIZATION

(71) Applicant: MOTOROLA SOLUTIONS, INC, Schaumburg, IL (US)

(72) Inventor: Alan P Conrad, Geneva, IL (US)

(*) Notice: Subject to any disclaimer, the term of this patent is extended or adjusted under 35 U.S.C. 154(b) by 139 days.

(21) Appl. No.: 14/587,184

(22) Filed: Dec. 31, 2014

(65) Prior Publication Data

US 2016/0191287 A1 Jun. 30, 2016

(51) Int. Cl.
*H04L 27/26* (2006.01)

(52) U.S. Cl.
CPC ................ *H04L 27/2607* (2013.01)

(58) Field of Classification Search
CPC .... H04L 5/0085; H04B 7/0697; H04B 1/7183
USPC .................................... 370/E1.001
See application file for complete search history.

(56) References Cited

U.S. PATENT DOCUMENTS

| | | | |
|---|---|---|---|
| 5,602,484 A | 2/1997 | Suzuki et al. | |
| 6,522,706 B1* | 2/2003 | Bahai | H04B 1/7073 375/343 |
| 7,746,941 B2 | 6/2010 | Chang et al. | |
| 8,483,330 B2 | 7/2013 | Li et al. | |
| 2003/0103555 A1 | 6/2003 | Han et al. | |
| 2004/0109515 A1* | 6/2004 | Krauss | H04L 1/0023 375/316 |
| 2010/0313739 A1* | 12/2010 | Lupini | G10H 1/0008 84/611 |
| 2011/0142114 A1* | 6/2011 | Goh | H04L 27/2607 375/224 |
| 2012/0027048 A1* | 2/2012 | Lindoff | H04L 25/03006 375/140 |

(Continued)

FOREIGN PATENT DOCUMENTS

| | | |
|---|---|---|
| AU | 2001018279 A1 | 8/2001 |
| AU | 2005208694 A1 | 8/2006 |

(Continued)

*Primary Examiner* — Charles C Jiang
*Assistant Examiner* — Will Lin

(57) ABSTRACT

Disclosed herein are methods and systems for dynamic single-frequency-network-(SFN)-multicast symbol synchronization. In an embodiment, a wireless-communication device (WCD) receives an SFN-multicast transmission at least in part by receiving a respective SFN-multicast-transmission signal from each site in a plurality of sites in a given SFN-multicast area, where each such received SFN-multicast-transmission signal has a respective SFN-multicast cyclic prefix. The WCD calculates a multisource multipath delay spread ("MMDS") that is characteristic of the received plurality of SFN-multicast-transmission signals, and determines whether that calculated MMDS exceeds a threshold MMDS. If so, the WCD selects a multicast timing point that is after the SFN-multicast cyclic prefix of a first-received one of the received SFN-multicast-transmission signals. If not, the WCD selects a multicast timing point that is within the SFN-multicast cyclic prefix of the first-received SFN-multicast-transmission signal. The WCD uses the selected multicast timing point to demodulate the received SFN-multicast transmission.

16 Claims, 14 Drawing Sheets

(56) References Cited

U.S. PATENT DOCUMENTS

| | | | | |
|---|---|---|---|---|
| 2012/0309405 A1* | 12/2012 | Parkvall | ............... | H04W 48/08 455/452.1 |
| 2013/0022090 A1* | 1/2013 | Weng | ............... | H04L 25/03343 375/219 |
| 2013/0122930 A1* | 5/2013 | Woo | ..................... | G01S 5/0205 455/456.1 |
| 2013/0225105 A1* | 8/2013 | Zeng | .................. | H04L 27/0006 455/226.1 |
| 2014/0086173 A1* | 3/2014 | Sadeghi | ................. | H04L 5/005 370/329 |
| 2016/0013897 A1* | 1/2016 | Sun | ..................... | H04L 1/0058 370/312 |

FOREIGN PATENT DOCUMENTS

| | | |
|---|---|---|
| AU | 2002357578 B2 | 12/2008 |
| EP | 1124348 A2 | 8/2001 |
| WO | 2013148076 A1 | 10/2013 |

* cited by examiner

METHODS AND SYSTEMS FOR DYNAMIC SINGLE-FREQUENCY-NETWORK-MULTICAST SYMBOL SYNCHRONIZATION

BACKGROUND OF THE INVENTION

It is important for people to have connectivity to communication services (e.g., telephony, data services, and the like). To facilitate communication between user equipment and various radio access networks (RANs), network entities such as eNodeBs, base stations, and the like typically operate to establish a link between a given wireless-communication device (WCD) (e.g., a handheld mobile radio) and a given network resource, typically using a standard for over-the-air communication, an example of which is 3GPP's Long Term Evolution (LTE), which is one example protocol for a type of wireless communication known as orthogonal frequency division multiplex (OFDM) communication. In addition to mobile radios, some examples of commonly used WCDs include cell phones, smartphones, tablets, notebook computers, laptop computers, and the like. And certainly many other examples of WCDs could be listed as well, as known to those having skill in the art.

One strategy that is often employed in the implementation of wireless networks—to, e.g., achieve improved coverage—involves increasing received signal power through use of redundant, time-synchronized, multiple-site transmissions. In this disclosure, such transmissions are referred to as single-frequency-network-(SFN)-multicast transmissions. One type of SFN-multicast transmissions is known in the art as multicast-broadcast SFN (MBSFN) transmissions, which is a term that is typically associated by those of skill in the art as being a 3GPP term that is particular to the cellular context. The term SFN-multicast transmissions as used in this disclosure applies more generally to transmissions that are broadcast by multiple transmitters (e.g., base stations) in a given wireless network, which could operate according to an OFDM technology. As examples, one or more such wireless networks could operate according to IEEE 802.11, IEEE 802.16, Digital Video Broadcasting (DVB), and/or one or more other wireless-communication technologies deemed suitable by those having skill in the relevant art in a given context or for a given implementation.

It is desirable for people to be able to communicate with one another in as many locations as possible; this is certainly true in the context of public-safety wireless communications for at least the reason that the immediacy and efficacy with which people can communicate with one another are quite often determinative of how positive the ultimate outcome of a given public-safety incident can be. Accordingly, for this reason and others, there is a need for methods and systems for dynamic SFN-multicast symbol synchronization.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
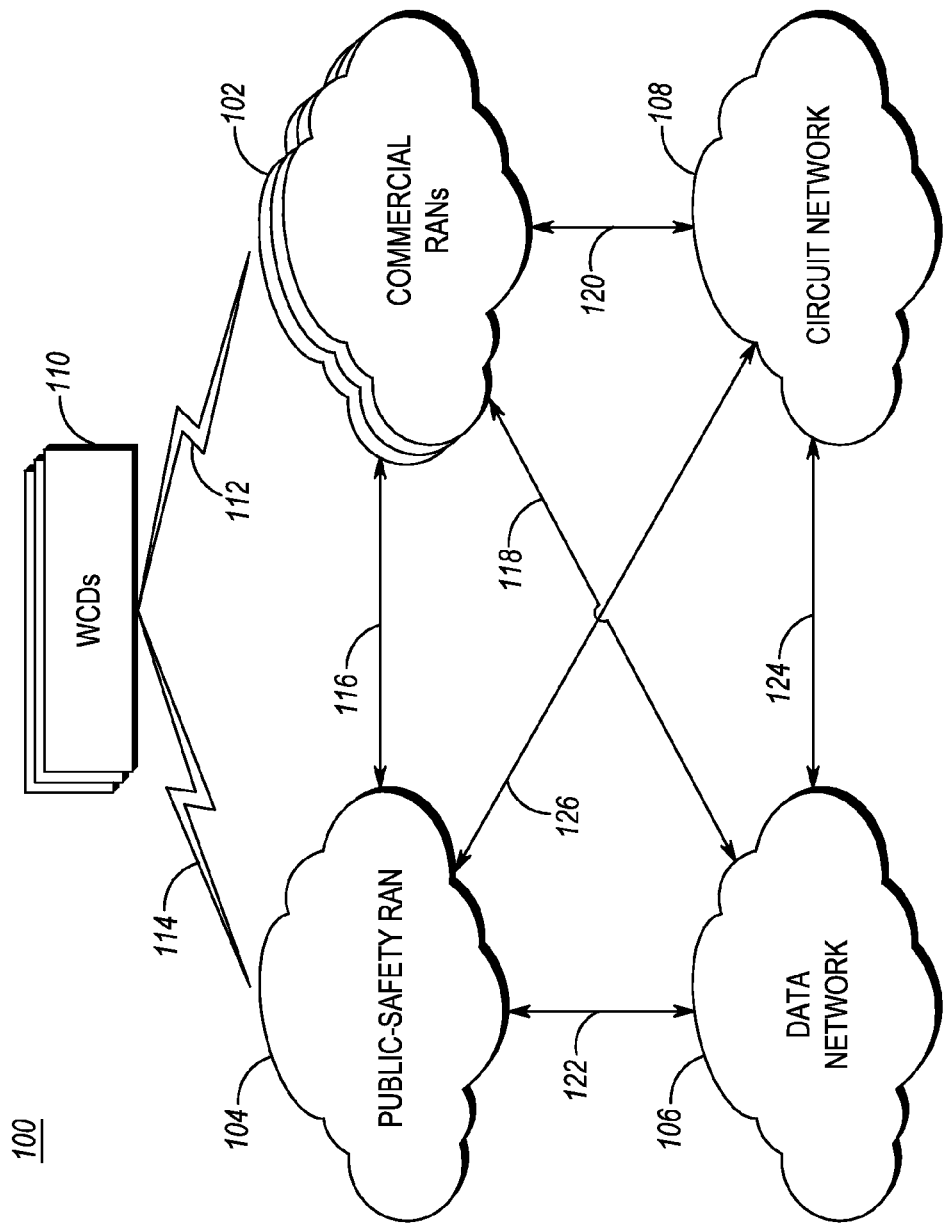
FIG. 1 depicts an example communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for dynamic SFN-multicast symbol synchronization.

One embodiment takes the form of a process that is carried out by a WCD. The process includes receiving an SFN-multicast transmission. Receiving the SFN-multicast transmission includes receiving a respective SFN-multicast-transmission signal from each site in a plurality of sites in a given SFN-multicast area. Each received SFN-multicast-transmission signal has a respective SFN-multicast cyclic prefix. The process also includes calculating a multisource multipath delay spread ("MMDS") that is characteristic of the received plurality of SFN-multicast-transmission signals. The process also includes determining whether the calculated MMDS exceeds an MMDS threshold. The process also includes selecting a multicast timing point that is (i) after the SFN-multicast cyclic prefix of a first-received one of the received SFN-multicast-transmission signals responsive to determining that the calculated MMDS exceeds the MMDS threshold or (ii) within the SFN-multicast cyclic prefix of the first-received SFN-multicast-transmission signal responsive to determining that the calculated MMDS does not exceed the MMDS threshold. The process also includes using the selected multicast timing point to demodulate the received SFN-multicast transmission.

Another embodiment takes the form of a system (i.e., a WCD) that includes a wireless-communication interface, a processor, and data storage containing instructions executable by the processor for causing the WCD to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the SFN-multicast transmission includes an MBSFN transmission, each respective SFN-multicast-transmission signal includes a respective MBSFN-transmission signal, each respective SFN-multicast cyclic prefix includes a respective MBSFN cyclic prefix, and the given SFN-multicast area includes a given MBSFN area.

In at least one embodiment, the process further includes (i) obtaining a respective correlation sequence for the SFN-multicast transmission with each reference signal in a set of known reference signals and (ii) locating a set of peaks in the set of obtained correlation sequences. In at least one such embodiment, the WCD calculates the MMDS based at least in part on the located set of peaks. In the balance of this detailed description, the term correlation-peaks embodiment is used as shorthand reference for such embodiments.

In at least one correlation-peaks embodiment, the WCD uses a respective matched filter to obtain each respective correlation sequence.

In at least one correlation-peaks embodiment, the WCD calculates the MMDS based at least in part on relative locations of an identified earliest peak and an identified latest peak.

In at least one correlation-peaks embodiment, the set of known reference signals includes a respective unicast reference signal from each site in the plurality of sites. In the balance of this detailed description, the term unicast-reference-signal embodiment is used as shorthand reference for such embodiments.

In at least one unicast-reference-signal embodiment, each obtained correlation sequence includes a respective maximum peak. It at least one such embodiment, locating the set of peaks includes locating the respective maximum peak in each obtained correlation sequence. In at least one further embodiment, the process further includes discarding at least one located maximum peak that does not exceed a correlation threshold prior to calculating the MMDS.

In at least one unicast-reference-signal embodiment, the process further includes identifying the respective unicast reference signals for inclusion in the set of known reference signals based at least in part on respective physical layer cell identifiers (PIDs) of the respective sites in the plurality of sites. In at least one such embodiment, the process further includes identifying the respective PIDs of the respective sites in the plurality of sites at least in part by carrying out site searching and site reselection. In at least one other such embodiment, the process further includes identifying the respective PIDs of the respective sites in the plurality of sites at least in part by receiving a list of the PIDs from a network.

In at least one correlation-peaks embodiment, the set of known reference signals consists of an SFN-multicast reference signal unique to the given SFN-multicast area. In at least one such embodiment, locating the set of peaks includes locating a set of local maxima that exceed a correlation threshold.

In at least one embodiment, the MMDS threshold is based on an SFN-multicast-transmission-signal-cyclic-prefix length. In at least one embodiment, the MMDS threshold is equal to an SFN-multicast-transmission-signal-cyclic-prefix length. In at least one embodiment, the MMDS threshold is 16.67 microseconds ($\mu$s).

In at least one embodiment, the WCD determines that the calculated MMDS exceeds the MMDS threshold, and responsively selects the multicast timing point to be a multicast-timing-point offset after an end of the SFN-multicast cyclic prefix of the first-received SFN-multicast-transmission signal. In at least one such embodiment, the process further includes determining the multicast-timing-point offset based at least in part on an estimated channel condition and at least in part on the calculated MMDS. In at least one further embodiment, the WCD selects a multiplier based at least in part on the estimated channel condition. In at least one such embodiment, the WCD determines the multicast-timing-point offset as a product of the selected multiplier and the calculated MMDS. In at least one embodiment, the estimated channel condition includes a channel type.

In at least one embodiment, the WCD determines that the calculated MMDS does not exceed the MMDS threshold, and responsively selects the multicast timing point to be within the SFN-multicast cyclic prefix of the first-received SFN-multicast-transmission signal. In at least one such embodiment, the WCD selects the multicast timing point based at least in part on (i) a unicast timing point associated with the first-received SFN-multicast-transmission signal and (ii) a difference between a unicast-cyclic-prefix length and an SFN-multicast-transmission-signal-cyclic-prefix length.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts", what a particular element or entity in a particular figure "is" or "has", and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

Figure 2:
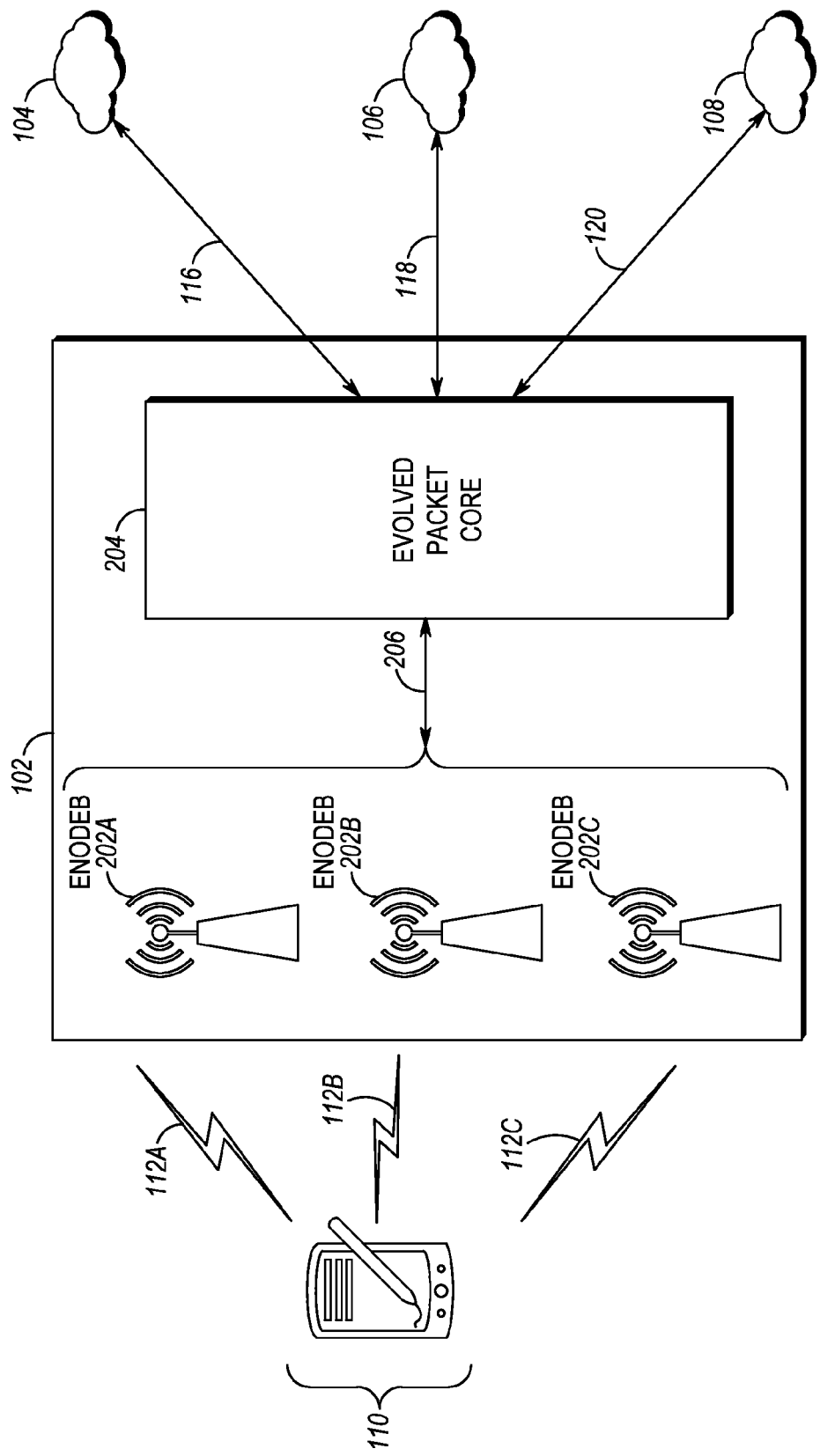
FIG. 2 depicts a further example of aspects of the communication system of FIG. 1, in accordance with an embodiment.

The following portion of this disclosure includes descriptions of FIGS. 1 and 2, which in general depict a communication system in which WCDs communicate via one or more RANs. It is explicitly noted that WCDs that communicate via one or more RANs may also be capable of communicating directly with one another. Thus, WCDs that are capable of both direct-mode and RAN-based communication could carry out and embody the present methods and systems.

FIG. 1 depicts an example communication system, in accordance with an embodiment. In particular, FIG. 1 depicts an example communication system 100 that includes one or more commercial RANs 102, a public-safety RAN 104, a data network 106, a circuit network 108, WCDs 110, and communication links 112-126.

In general, in at least one embodiment, each RAN 102 and the RAN 104 includes typical RAN elements such as base stations, base station controllers (BSCs), routers, switches, and the like, arranged, connected, and programmed to provide wireless service to user equipment (e.g., WCDs 110) in a manner known to those of skill in the relevant art.

The public-safety RAN 104, an example implementation of which is discussed below in connection with FIG. 2, may include one or more packet-switched networks and/or one or more circuit-switched networks, and in general functions to provide one or more public-safety agencies with any necessary computing and communication needs. Thus, the public-safety RAN 104 may include a dispatch center communicatively connected with the data network 106 and also with the circuit network 108, for retrieving and transmitting any necessary public-safety-related data and communications. The public-safety RAN 104 may also include any necessary computing, data-storage, and data-presentation resources utilized by public-safety personnel in carrying out their public-safety functions. Moreover, the public-safety RAN 104 may include one or more network access servers (NASs), gateways, and the like for bridging communications to one or more other entities and/or networks, such as the commercial RANs 102, the data network 106, and the circuit network 108, as representative examples.

The data network 106 may include or be a part of the global network of networks typically referred to as the Internet. The data network 106 may be a packet-switched network, and entities (i.e., servers, routers, computers, and the like) that communicate over the data network 106 may be identified by a network address such as an Internet Protocol (IP) address. Moreover, the data network 106 may include one or more NASs, gateways, and the like for bridging communications to one or more other entities and/or networks, such as the commercial RANs 102, the public-safety RAN 104, and the circuit network 108, as examples.

The circuit network 108 may include or be a part of the circuit-switched telephone network commonly referred to as the public switched telephone network (PSTN), and in general functions to provide circuit-switched communications to various communication entities as is known in the relevant art. Moreover, the circuit network 108 may include one or more NASs, gateways, and the like for bridging communications to one or more other entities and/or networks, such as the commercial RANs 102, the public-safety RAN 104, and the data network 106, as examples.

The depicted example communication system 100 includes communication links 112-126, any one or more of which could include one or more wireless-communication links and/or one or more wired-communication links. In FIG. 1, the communication links 112 and 114 are depicted with respective lightning-bolt graphics; while this graphic typically denotes wireless communication, and does in this example as well, this is not to the exclusion of one or more of the other communication links 116-126 being or including wireless-communication links.

The WCDs 110 may be any suitable computing and communication devices configured to engage in wireless communication with one or both of (i) one or more of the RANs 102 over the air interface 112 as is known to those in the art and (ii) the public-safety RAN 104 over the air interface 114 as is known to those in the art. Some example WCDs 110 are discussed below in connection with the various figures.

As can be seen in FIG. 1, the communication link 112 (as mentioned above) connects the commercial RANs 102 and the WCDs 110, the communication link 114 (as mentioned above) connects the public-safety RAN 104 and the WCDs 110, the communication link 116 connects the commercial RANs 102 and the public-safety RAN 104, the communication link 118 connects the commercial RANs 102 and the data network 106, the communication link 120 connects the commercial RANs 102 and the circuit network 108, the communication link 122 connects the public-safety RAN 104 and the data network 106, the communication link 124 connects the data network 106 and the circuit network 108, and the communication link 126 connects the public-safety RAN 104 and the circuit network 108. This arrangement is provided purely by way of example, as other arrangements could be implemented by those of skill in the relevant art in various different contexts.

FIG. 2 depicts a further example of aspects of the communication system of FIG. 1, in accordance with an embodiment. FIG. 2 depicts the communication system 100 of FIG. 1, though in more detail regarding some example WCDs 110 and an example commercial RAN 102, although a similar figure could be depicted with an example public-safety RAN 104 instead of the example commercial RAN 102. In particular, FIG. 2 depicts the commercial RAN 102 as including eNodeBs 202A-C, which communicate directly or indirectly with an evolved packet core (EPC) 204 over a communication link 206. As is the case with each of the links mentioned above, and as is the case with any of the links mentioned anywhere else in this disclosure, the communication link 206 may be or include one or more wireless-communication links and/or one or more wired-communication links, as deemed suitable by those of skill in the relevant art in a given context.

In at least one embodiment, the eNodeBs 202A-C include the hardware and software (and/or firmware) necessary for the eNodeBs 202A-C to function as eNodeBs, NodeBs, base stations, base transceiver stations (BTSs), WiFi access points, and/or the like, as known to those having skill in the relevant art. In some instances, the eNodeBs 202A-C also include functionality typically associated in the art with entities that are often referred to by terms such as BSCs, radio network controllers (RNCs), and the like. Also, while three eNodeBs, eNodeBs 202A-C, are depicted by way of example in FIG. 2, any suitable number of eNodeBs could be deployed as deemed suitable by those of skill in the relevant art.

In general, the eNodeBs 202A-C are entities that, on one side (i.e., the wireless-network side (interface)), engage in wireless communications over the respective air interfaces 112A-C with one or more WCDs 110 according to a protocol such as LTE, or the like and, on the other side (i.e., the "backhaul" side (interface)), engage in communications with the EPC 204 via the communication link 206, to facilitate communications between various WCDs 110 and networks such as the networks 104, 106, and 108, as examples.

The EPC 206 may include one or more network entities such as one or more mobility management entities (MMEs), one or more serving gateways (SGWs), one or more packet data network (PDN) gateways (PDGs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 110 via the eNodeBs 202A-C, and to bridge such wireless service with various transport networks. In general, a commercial RAN and a public-safely RAN may each provide wireless service according to a protocol such as LTE, WiFi, APCO P25, and/or the like. These examples are provided for illustration and not by way of limitation; moreover, those of skill in the art are aware of variations among different protocols and among different implementations of a given protocol, and of similarities across different protocols.

Additionally, the commercial RAN 102 may include the hardware and software (and/or firmware) necessary for LTE's Enhanced Multimedia Broadcast/Multicast Services (E-MBMS). Furthermore, the commercial RAN 102 may include the hardware and software (and/or firmware) necessary for communicating via a Dynamic Single Frequency Network (DSFN). In particular, the commercial RAN 102 may include the hardware and software (and/or firmware) necessary for communication via an SFN-multicast (e.g., MBSFN) communication channel, such as one or more Broadcast/Multicast Service Centers (BM-SCs), one or more Multicell/Multicast Coordination Entities (MCEs), and one or more Multimedia Broadcast Multicast Service Gateways (MBMS GWs). The BM-SC controls MBMS sessions and corresponding MBMS bearers. The MBMS GW is an entity that is located between a content provider and the eNodeBs 202A-C. The control plane of the MBMS GW is involved in MBMS session start/setup via the MME. The user plane of the MBMS GW is (i) responsible for delivering user data over an IP-multicast-capable transport network to the eNodeBs 202A-C and (ii) participates in content synchronization for MBMS services using SFN-multicast (e.g., MBSFN). The MBMS GW may be part of the EPC 204. The MCE is an entity that is responsible for coordinating the usage of SFN-multicast (e.g., MBSFN) transmission within the same SFN-multicast (e.g., MBSFN) area. The MCE resides between the MME and the eNodeBs 202A-C. The MCE may be integrated into each of the eNodeBs 202A-C.

Figure 3:
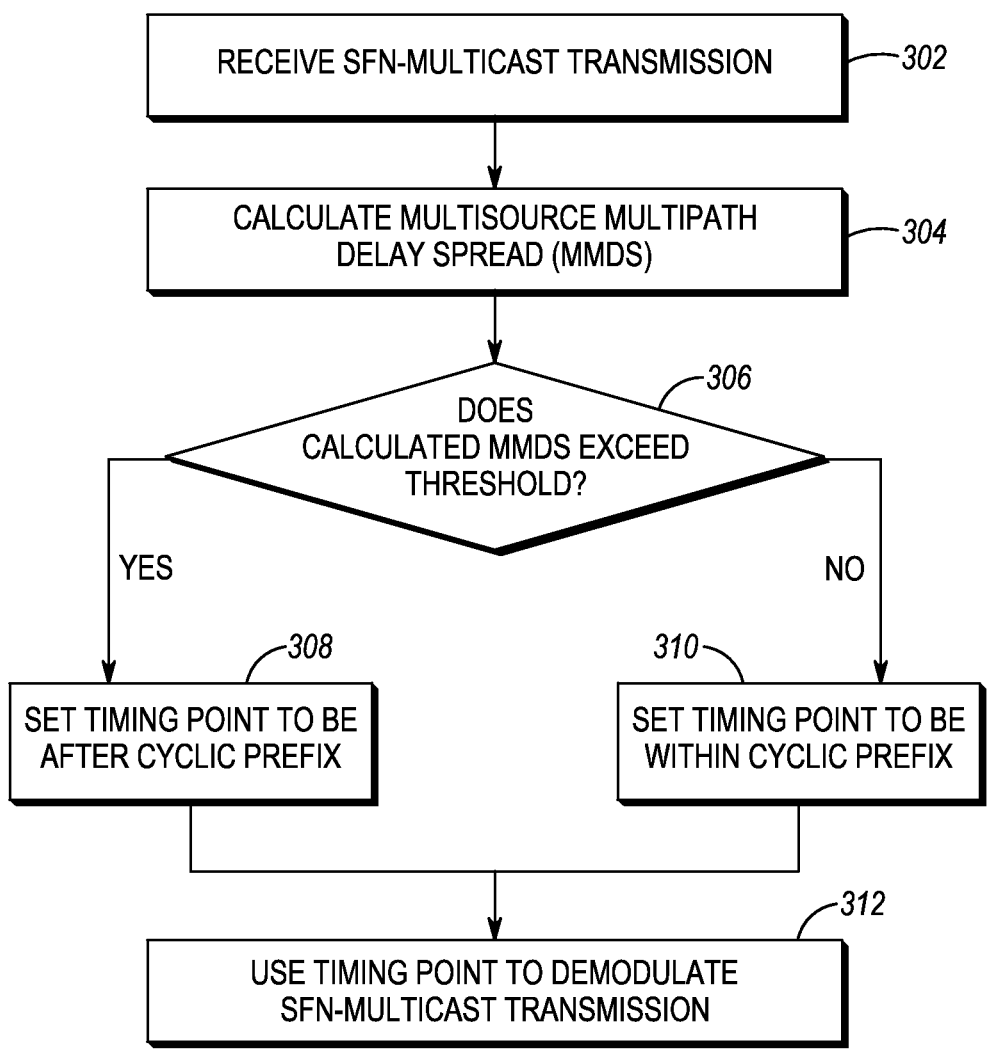
FIG. 3 depicts an example process, in accordance with an embodiment.

FIG. 3 depicts an example process, in accordance with an embodiment. In particular, FIG. 3 depicts a process 300 that includes steps 302, 304, 306, 308, 310, and 312. Although primarily depicted and described as being performed serially, at least a portion of the steps of the process 300 may be performed contemporaneously, or in a different order than depicted and described with respect to FIG. 3. These steps are described below.

In at least one embodiment, the process 300 is carried out by a mobile radio such as an example WCD 110 or an example CCD 1400. In general, the process 300 could be carried out by any radio (e.g., by any mobile radio, portable radio, and/or other radio) having a receiver and being otherwise suitably equipped, programmed, and configured to carry out the process 300 (and/or one or more of the many variants of the process 300 that are discussed herein).

Step 302 includes receiving an SFN-multicast transmission at least in part by receiving a respective SFN-multicast-transmission signal from each site in a plurality of sites in a given SFN-multicast area. Each received SFN-multicast-transmission signal has a respective SFN-multicast cyclic prefix.

Step 304 includes calculating an MMDS that is characteristic of the received plurality of SFN-multicast-transmission signals. (The reader will recall that, as used in this disclosure, "MMDS" means "multisource multipath delay spread".)

In at least one embodiment, the process 300 includes (i) obtaining a respective correlation sequence for the SFN-multicast transmission with each reference signal in a set of known reference signals and (ii) locating a set of peaks in the set of obtained correlation sequences. In at least one such embodiment, the WCD calculates the MMDS based at least in part on the located set of peaks. As stated above, in this disclosure, the term correlation-peaks embodiment is used as shorthand reference for such embodiments.

Typically, in various different correlation-peaks embodiments, the WCD uses a number of items of information in addition to the located set of peaks to calculate the MMDS. As one example, the WCD often also uses the respective values of the peaks, such as their magnitude-squared values, for example. Often, the locations of the peaks are weighted by the peak values as part of obtaining (e.g., calculating) the MMDS. And certainly other examples could be listed as well.

In at least one correlation-peaks embodiment, the WCD uses a respective matched filter to obtain each respective correlation sequence. Some example correlation sequences are depicted in and described below in connection with FIGS. 8 and 9.

Step 306 includes determining whether the calculated MMDS exceeds an MMDS threshold. In at least one embodiment, the MMDS threshold is based on (e.g., equal to) a length of an SFN-multicast-transmission-signal cyclic prefix. In at least one embodiment, the MMDS threshold is 16.67 µs.

Step 308 includes selecting a multicast timing point to be after the SFN-multicast cyclic prefix of a first-received one of the received SFN-multicast-transmission signals responsive to determining that the calculated MMDS does exceed the MMDS threshold.

In at least one embodiment in which the WCD does in fact determine that the calculated MMDS exceeds the MMDS threshold, the WCD responsively selects the multicast timing point to be a multicast-timing-point offset after an end of the SFN-multicast cyclic prefix of a first-received one of the received SFN-multicast-transmission signals. In at least one such embodiment, the WCD determines the multicast-timing-point offset based at least in part on an estimated channel condition and at least in part on the calculated MMDS. In at least one further embodiment, the WCD selects a multiplier based at least in part on the estimated channel condition. In at least one such embodiment, the WCD determines the multicast-timing-point offset as a product of the selected multiplier and the calculated MMDS. In at least one embodiment, the estimated channel condition includes a channel type. In at least one embodiment the multiplier is between 0 and 1.

In an example scenario in which the WCD determines that the calculated MMDS exceeds the MMDS threshold, the WCD estimates channel conditions and compares those estimated channel conditions to one or more sets of pre-stored channel conditions that are associated with various (potentially different) multipliers. The WCD may then select the stored multiplier (as the above-mentioned "selected multiplier") that is associated with the set of pre-stored channel conditions that most closely matches the estimated channel conditions. Some examples of channel conditions include Doppler rate, multipath delay spread (which, it is noted, is different than the MMDS (i.e., the multisource multipath delay spread) that is calculated at step 304), signal strength, signal-to-noise ratio (SNR), signal-to-noise-and-interference ratio (SINR), channel quality indicator (CQI), reference signal received power (RSRP), reference signal received quality (RSRQ), and the like. Another metric (that is not a channel condition in the most common usage of that term) that could be used is an LTE-specific metric known to those having skill in the relevant art as the modulation and coding scheme (MCS). And certainly other examples could be listed as well.

Indeed, further examples of channel conditions, metrics, and/or the like with respect to which the WCD could compare estimated values to pre-stored values as at least part of selecting the above-mentioned selected multiplier include a category of metrics known as error rates. Some representative examples of error rates include what are known in the art as the block error rate (BLER) and the bit error rate (BER), though certainly other examples of error rates could be listed here. Moreover, in addition to being a metric used by the WCD in operation (e.g., to compare estimated values to pre-stored values when choosing the selected multiplier), it may also be the case that error rates such as the BLER were used when selecting one or more multipliers which with to provision the WCD in the first place. That is, in an example, a determination could be made (e.g. experimentally and/or using computer-based models) of the maximum MMDS at which a certain threshold BLER is not exceeded as a function of numerous different possible multipliers. Indeed, such a determination could be made with respect to multiple different channel types (e.g., EPA5, EVA70, and the like) and/or with respect to more than one threshold BLER (e.g., 1% and 10%). Using such determinations, a particular multiplier, range of multipliers, set of multipliers, and/or the like could be chosen and provisioned to one or more WCDs for use in carrying out one or more embodiments, so as to attempt to maximize (or at least approximately maximize) the range of possible MMDS over which communication is supported at or below what is determined by those of skill in art to be suitable for a given context with respect to one or more error rates (e.g., BLER, BER, and/or the like).

In identifying a stored multiplier that is associated with a closest pre-stored set of channel conditions, MCS, BLER, and/or the like, the WCD may access a locally stored or remotely stored lookup table that associates such pre-stored sets with such pre-stored multipliers. For example, if the WCD determines that the estimated channel conditions correspond most closely with a given pre-stored set of channel conditions, MCS, BLER, and/or the like, the WCD would select the pre-stored multiplier that is associated in the pre-stored lookup table with that given pre-stored set, and then use that selected multiplier to determine the multicast-timing-point offset—e.g., by calculating the multicast-timing-point offset to be the product of the selected multiplier and the calculated MMDS.

Step 310 includes selecting the multicast timing point to be within the SFN-multicast cyclic prefix of the first-received one of the received SFN-multicast-transmission signals responsive to determining that the calculated MMDS does not exceed the MMDS threshold.

In general, using LTE and MBSFN by way of illustration, downlink data is sent from eNodeBs to WCDs in a defined frame structure that includes what are known as unicast subframes and MBSFN subframes, each of which contain symbol periods that have their own cyclic prefixes. Moreover, it is often the case that unicast cyclic prefixes are shorter in duration than MBSFN cyclic prefixes. The eNodeB typically sends data addressed to a particular WCD in unicast subframes, and typically sends data meant as a multicast for multiple (e.g., all) WCDs in MBSFN subframes. Typically, WCDs derive timing points for use in demodulating MBSFN subframes based on unicast synchronization with a single eNodeB to which the WCD has attached.

In at least one embodiment in which the WCD does in fact determine that the calculated MMDS does not exceed the MMDS threshold, the WCD responsively selects the multicast timing point to be within the SFN-multicast cyclic prefix of the first-received one of the received SFN-multicast-transmission signals. In at least one such embodiment, the WCD selects the multicast timing point based at least in part on (i) a unicast timing point associated with the first-received SFN-multicast-transmission signal and (ii) a difference between a unicast-cyclic-prefix length and an SFN-multicast-transmission-signal-cyclic-prefix length. Using LTE and MBSFN by way of example illustration, a unicast timing point is a timing point that the WCD would use to demodulate signals sent from a given LTE site to that WCD in particular, where such signals are known in the art as unicast signals. It is known in the art how a WCD can determine a unicast timing point with respect to a particular LTE site. Thus, in an example scenario, the WCD may select the multicast timing point at least in part by determining a unicast timing point of the particular LTE site from which the WCD received the first-received one of the MBSFN-transmission signals. As an example, the determined unicast timing point may fall just before the end of a unicast-cyclic-prefix length. Thus, if the determined unicast timing point was 4.9 μs, and if the SFN-multicast-transmission-signal-cyclic-prefix length was 7.0 μs longer than the standard unicast-cyclic-prefix length, then the WCD may determine the multicast timing point to be 11.9 μs (i.e., the sum of 4.9 μs and 7.0 μs). And certainly other examples could be listed.

A second example pertains to a scenario in which the WCD determines (at step 306) that the calculated MMDS does exceed the MMDS threshold, and therefore responsively (at step 308) selects a multicast timing point to be after the SFN-multicast cyclic prefix of the first-received SFN-multicast-transmission signal. Again using LTE and MBSFN for example illustration, the WCD may carry out functions similar to those explained in the preceding paragraph to determine that the MBSFN CP ends a 11.9 μs, and may then select the multicast timing point to be that value plus the multicast-timing-point offset, which the WCD may calculate as the product of the selected multiplier and the calculated MMDS. Thus, continuing the present example, if the selected multiplier was 0.15 and the calculated MMDS was 14 μs, the WCD would calculate the multicast-timing-point offset to be 2.1 μs (i.e., the product of 0.15 and 14 μs), and the resulting multicast timing point would be 14.0 μs (i.e., the sum of 11.9 μs and 2.1 μs). And certainly numerous other examples could be presented.

Step 312 includes demodulating the SFN-multicast transmission based at least in part on the selected multicast timing point. FIGS. 10-13 depicts various demodulation windows that may be used to demodulate the SFN-multicast transmission as determined by the processes described herein.

Figure 4:
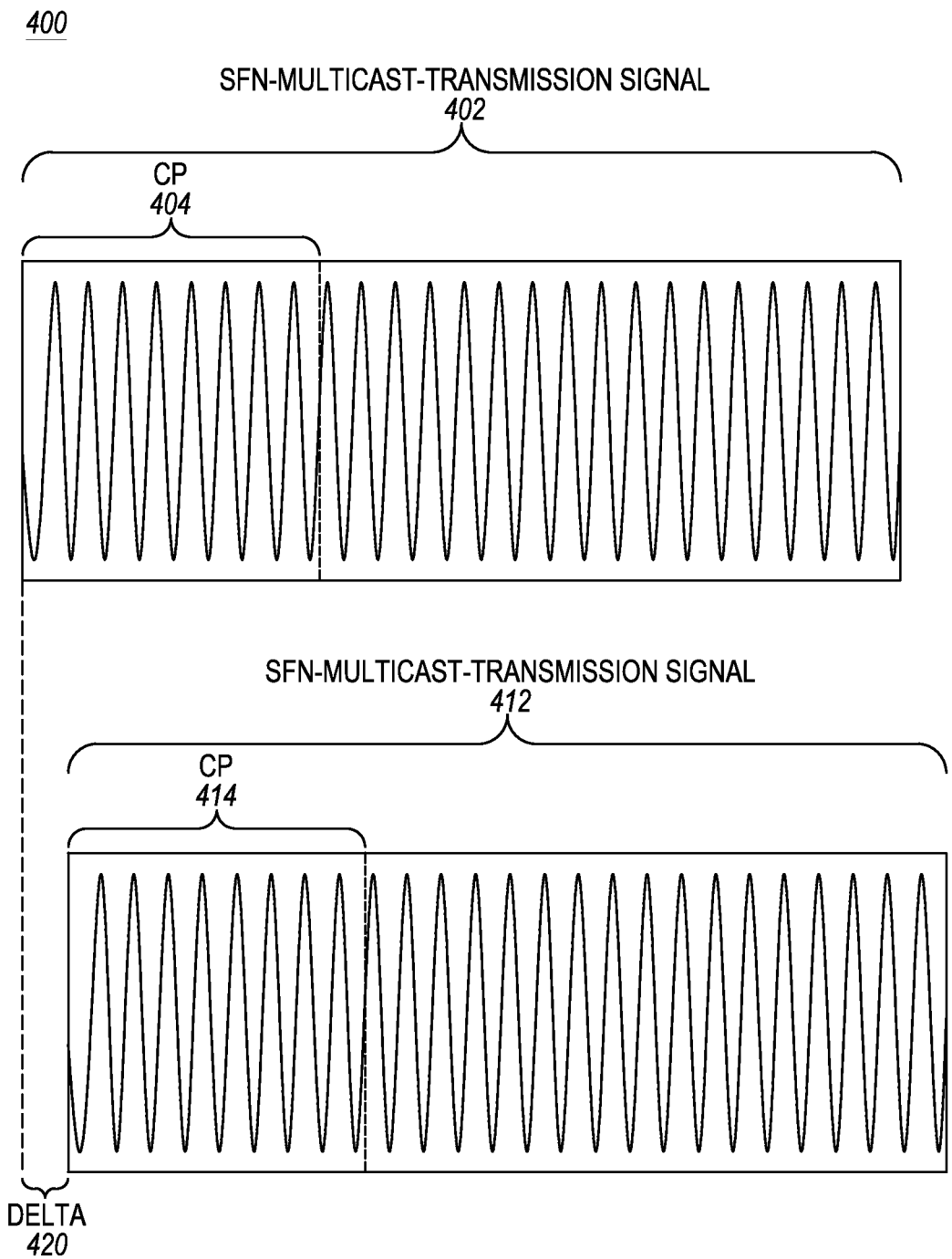
FIG. 4 depicts a first example set of SFN-multicast-transmission signals, in accordance with an embodiment.

FIG. 4 depicts a first example set of SFN-multicast-transmission signals, in accordance with an embodiment. In particular, FIG. 4 depicts a set 400 of SFN-multicast-transmission signals. The set 400 includes an SFN-multicast-transmission signal 402 and an SFN-multicast-transmission signal 412. The SFN-multicast-transmission signal 402 includes a cyclic prefix (CP) 404, and the SFN-multicast-transmission signal 412 includes a CP 414.

It is noted that FIG. 4 depicts a single symbol period in connection with each of the SFN-multicast-transmission signal 402 and the SFN-multicast-transmission signal 412, and accordingly does not explicitly depict any symbol periods before or after either the SFN-multicast-transmission signal 402 or the SFN-multicast-transmission signal 412. And though no preceding symbol periods are explicitly depicted, it will be understood by those of skill in the art that there are preceding symbol periods in which respective OFDM symbols are transmitted. Furthermore, those of skill in the art are familiar in general with the use of CPs in the context of OFDM communication to address, e.g., intersymbol interference (ISI) that can occur due to multipath effects even in a single transmitter, single receiver context (e.g., unicast communications from one eNodeB to one WCD). The present disclosure is more focused on the multisource multipath effects that arise in contexts such as SFN-multicast (e.g., MBSFN) in which a given WCD is receiving the same message from each of multiple transmitters that are likely somewhat disparately located.

The SFN-multicast-transmission signals 402 and 412 are received by a WCD in connection with the above-described step 302 of the example process 300. As can be seen in FIG. 4, the SFN-multicast-transmission signal 402 is received earlier in time than the SFN-multicast-transmission signal 412 by a time delta 420. The SFN-multicast-transmission signal 402 corresponds to an SFN-multicast-transmission signal from a first site in the plurality of sites in a given SFN-multicast-transmission area. The SFN-multicast-transmission signal 412 corresponds to an SFN-multicast-transmission signal from a second site in the plurality of sites in the given SFN-multicast area. The depiction of two SFN-multicast-transmission signals is purely for the sake of visual simplicity. Each site in the plurality of sites in the given SFN-multicast area transmits a respective SFN-multicast-transmission signal. Each SFN-multicast-transmission signal is received at a respective delta relative to a first-received SFN-multicast-transmission signal (e.g., the SFN-multicast-transmission signal 402). The various SFN-multicast-transmission signals are aggregated in an air interface before they are received by the WCD. The aggregated signal is referred to as an SFN-multicast transmission. And it is noted that the delta (in time) between received SFN-multicast-transmission signals is one relevant factor in computing the herein-described MMDS with respect to the received SFN-multicast transmission, and that the as-received signal strengths of the received SFN-multicast-transmission signals is another relevant factor; that is, it is often the case that computing the MMDS with respect to the received SFN-multicast transmission (and indeed with respect to computing multipath delay spreads in general) involves computing a weighted average where the various weights are determined at least in part by the various respective as-received signal strengths of the various received SFN-multicast-transmission signals. And certainly other approaches could be used as well to compute the MMDS.

Figure 5:
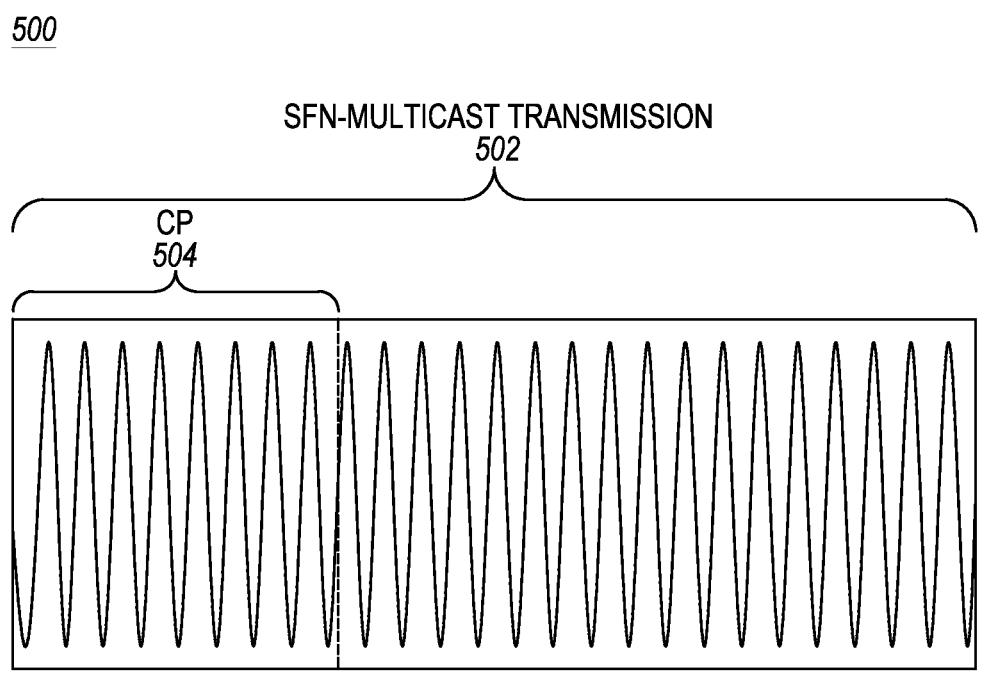
FIG. 5 depicts a first example SFN-multicast transmission, which corresponds to the first example set of SFN-multicast-transmission signals of FIG. 4, in accordance with an embodiment.

FIG. 5 depicts a first example SFN-multicast transmission, which corresponds to the first example set of SFN-multicast-transmission signals of FIG. 4, in accordance with an embodiment. In particular, FIG. 5 is a depiction 500 of an SFN-multicast transmission 502 that corresponds to the example set 400 of SFN-multicast-transmission signals 402 and 412 of FIG. 4. The SFN-multicast transmission 502 includes a CP 504. In FIGS. 4 and 5, the estimated MMDS is less than the MMDS threshold (corresponding to the delta 420 being relatively small, i.e., extending in the depicted embodiment not even as far as the end of the CP 404 of the SFN-multicast-transmission signal 402).

Figure 6:
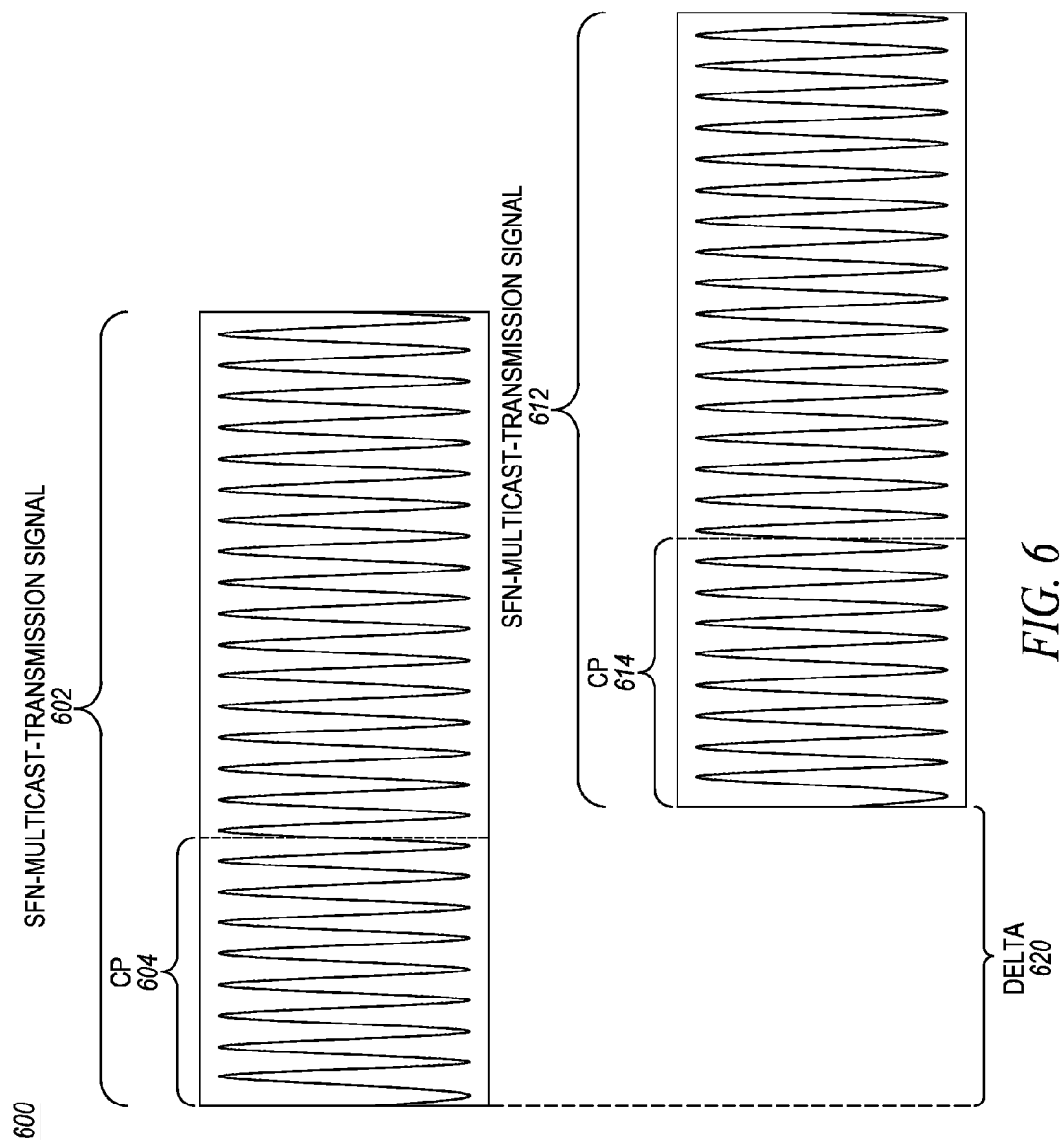
FIG. 6 depicts a second example set of SFN-multicast-transmission signals, in accordance with an embodiment.

FIG. 6 depicts a second example set of SFN-multicast-transmission signals, in accordance with an embodiment. In particular, FIG. 6 depicts a set 600 of SFN-multicast-transmission signals that includes an SFN-multicast-transmission signal 602 and an SFN-multicast-transmission signal 612. The SFN-multicast-transmission signal 602 includes a CP 604, and the SFN-multicast-transmission signal 612 includes a CP 614. The SFN-multicast-transmission signals 602 and 612 are received by a WCD, and indeed the SFN-multicast-transmission signal 602 is received earlier in time than the SFN-multicast-transmission signal 612 by a time delta 620, which in the depicted examples is greater than the time delta 420 that is depicted in FIG. 4, and in fact extends beyond the end of the CP 604 of the SFN-multicast-transmission signal 602. As such, there is no demodulation window that could be selected such that there would be no multipath effect due to the multisource nature of the transmission, as is further discussed below. Like the SFN-multicast-transmission signals 402 and 412 of FIG. 4, the SFN-multicast-transmission signals 602 and 612 correspond respectively to SFN-multicast-transmission signals received from first and second network sites in a given SFN-multicast area.

Figure 7:
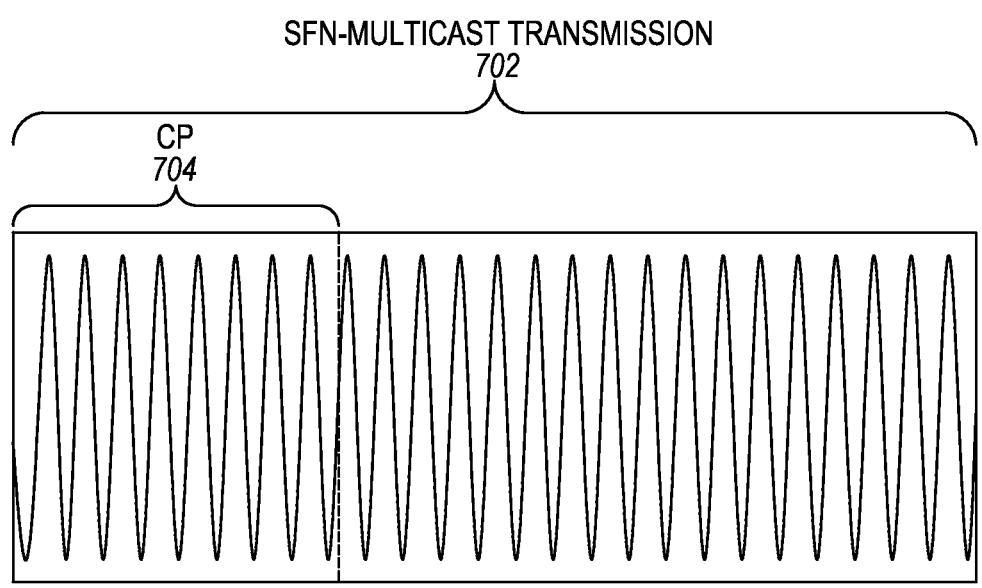
FIG. 7 depicts a second example SFN-multicast transmission, which corresponds to the second example set of SFN-multicast-transmission signals of FIG. 6, in accordance with an embodiment.

FIG. 7 depicts a second example SFN-multicast transmission, which corresponds to the second example set of SFN-multicast-transmission signals of FIG. 6, in accordance with an embodiment. In particular, FIG. 7 is a depiction 700 of an SFN-multicast transmission 702 that corresponds to the example set 600 of SFN-multicast-transmission signals 602 and 612 of FIG. 6. The SFN-multicast transmission 702 includes a CP 702. In FIGS. 6 and 7, the estimated delay spread is greater than the MMDS threshold. Indeed, as noted above, and as can be seen in FIG. 6, the CP 614 of the SFN-multicast-transmission signal 612 begins after the end of the CP 604 of the SFN-multicast-transmission signal 602.

Figure 8:
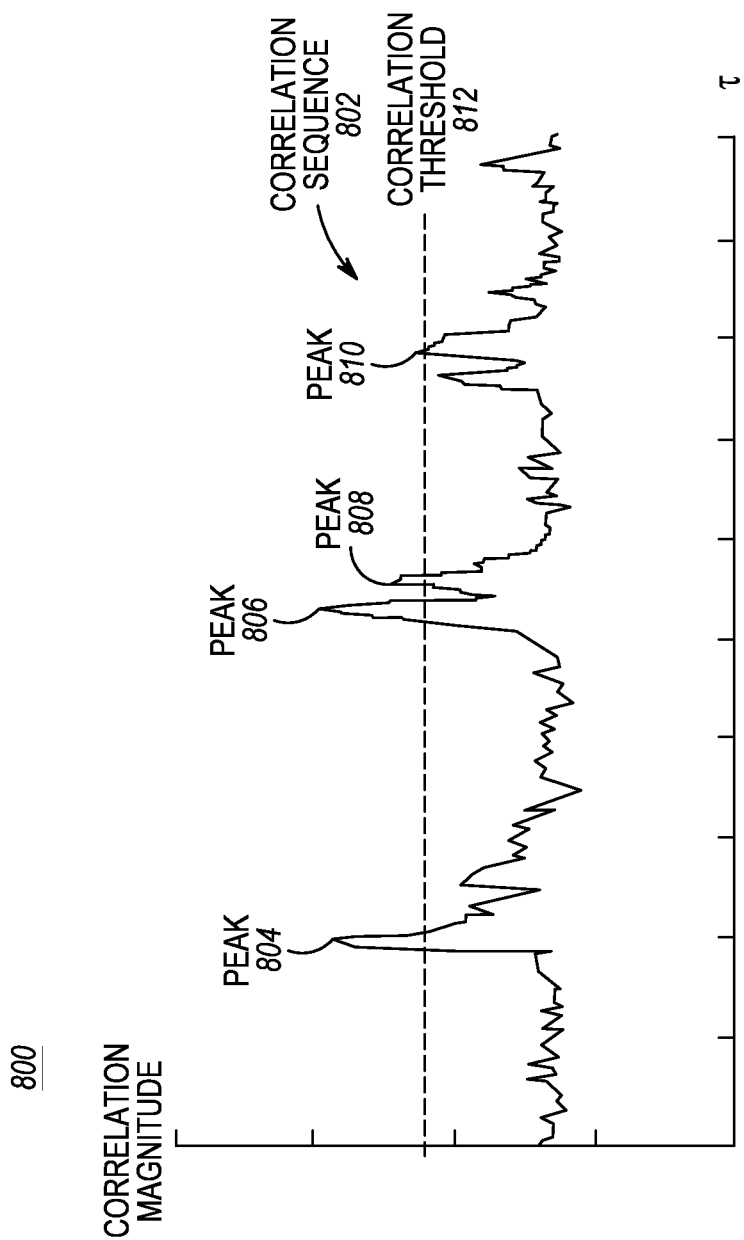
FIG. 8 depicts a first example correlation sequence generated using an SFN-multicast reference signal, in accordance with an embodiment.
Figure 9:
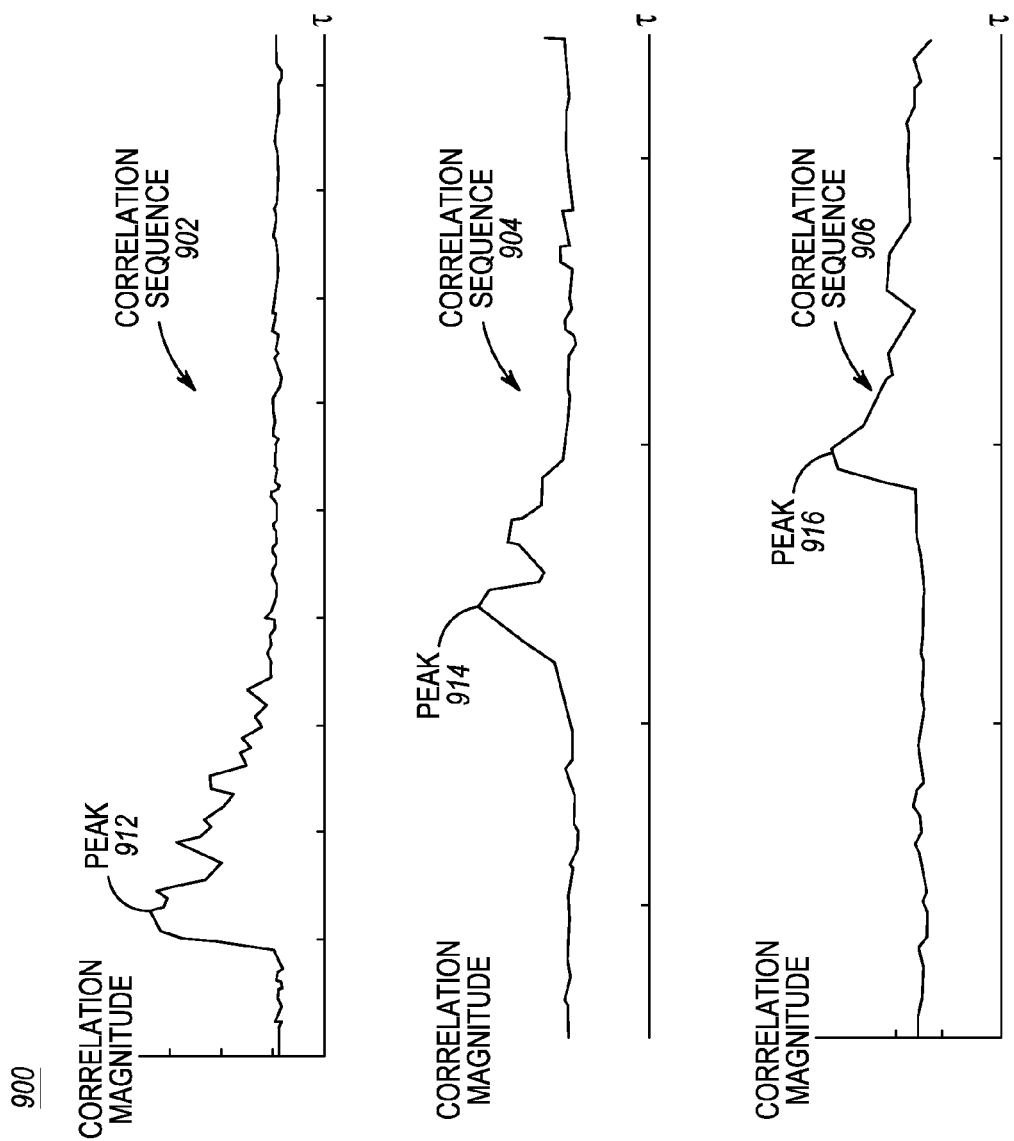
FIG. 9 depicts a set of example correlation sequences each being generated using a unique unicast reference signal, in accordance with an embodiment.

FIGS. 8 and 9 depict various correlation sequences and at least one embodiment makes reference to a correlation threshold. A correlation value can be normalized to range between −1 and +1. Additionally, a correlation sequence can be made to range from 0 to 1 if, e.g., magnitude-squared values of various normalized correlation values are used. Both FIGS. 8 and 9 depict correlation sequences that are made to range from 0 to 1. In such examples, a correlation threshold can be a single value ranging from 0 to 1. In embodiments in which a range of a correlation sequence is from −1 to +1, a correlation threshold can be a pair of values (e.g., −0.7 and +0.7 which will allow only peaks that represent correlation values with magnitudes greater than 0.7, or even −0.5 and +0.8). As is known by those with skill in the relevant art, correlation sequences depict how closely a reference signal matches another signal (i.e., an SFN-multicast transmission) when compared at a plurality of offset values.

FIG. 8 depicts a first example correlation sequence generated using an SFN-multicast reference signal, in accordance with an embodiment. In particular, FIG. 8 is a depiction 800 that includes an example correlation sequence 802, peaks 804-810, and a correlation threshold 812. The correlation sequence 802 represents magnitudes of correlation values between an SFN-multicast (e.g., MBSFN) reference signal and the SFN-multicast (e.g., MBSFN) transmission for a sequence of sample times. The peaks 804-810 are identified as being local maxima that are above the correlation threshold 812. The distance between the peaks 804-810 (as well as magnitude-squared values) can be used to estimate the MMDS. In at least one correlation-peaks embodiment, the WCD calculates the MMDS based at least in part on relative locations of an identified earliest peak, the peak 804, and an identified latest peak, the peak 810. In at least one correlation-peaks embodiment, the set of known reference signals consists of an SFN-multicast reference signal unique to the given SFN-multicast area. In at least one such embodiment, locating the set of peaks comprises locating a set of local maxima that exceed a correlation threshold. In at least one embodiment, locating the set of peaks involves choosing the first N (i.e., any number of) largest peaks rather than using a particular threshold. As a general matter, in various different embodiments, one or more of the below-described delay-spread-estimation techniques, and/or one or more other suitable techniques, may be used in determining the MMDS.

FIG. 9 depicts a set of example correlation sequences that are each generated using a unique unicast reference signal, in accordance with an embodiment. In particular, FIG. 9 depicts a set 900 of correlation sequences. The set 900 includes correlation sequences 902-906. Each correlation sequence in the set of correlation sequences 900 is generated using a unique unicast reference signal that is associated with one site in the plurality of sites in the given SFN-multicast (e.g., MBSFN) area. A single absolute maximum is located within each correlation sequence. In correlation sequence 902, the absolute maximum is located at peak 912. In correlation sequence 904, the absolute maximum is located at peak 914. In correlation sequence 906, the absolute maximum is located at peak 916. The locations of these maxima (i.e., the peaks 912-916) can be used to estimate the MMDS. Another option for estimating the MMDS uses the N (i.e., any number of) maximum peaks in the respective correlation sequences. As also stated above in connection with FIG. 8, in various different embodiments, one or more of the below-described delay-spread-estimation techniques, and/or one or more other suitable techniques, may be used in determining the MMDS.

In general, any delay-spread-estimation technique deemed suitable by one of skill in the relevant art could be used in determining the MMDS. This includes time-domain delay-spread-estimation techniques, frequency-domain delay-spread-estimation techniques, and hybrid time-domain-and-frequency-domain delay-spread-estimation techniques.

One time-domain technique for determining (e.g., estimating) the delay spread of a channel is known as cross-correlation, also known as matched filtering. Within a transmitted signal is a waveform known by both the transmitter and the receiver. This is generally a synchronization signal but could also be a pilot signal (which is further discussed below in connection with frequency-domain techniques). In the context of LTE, as an example, synchronization signals include the Primary and Secondary Synchronization signals, pilot signals include unicast reference signals or MBSFN reference signals. At the receiver, the known synchronization signal is cross-correlated with the received signal. The cross-correlation operation identifies a peak that shows the location within the received signal where the synchronization waveform resides. The magnitude of the peak is related to the power of the synchronization signal. When a signal is transmitted through a channel exhibiting multipath, the cross-correlation output will contain several peaks of varying magnitudes related to each path the signal takes; it is noted that an example of such an output is depicted by correlation sequence 902. In the case of an MBSFN transmission and the use of an MBSFN reference signal for the synchronization signal (in the example context of LTE) the cross-correlation output will contain several peaks of varying magnitudes due to the transmission of various MBSFN transmission signals. An example of such an output is depicted by correlation sequence 802. From the location of the peaks, delays relative to the earliest peak (e.g., peak 804 or peak 912) can be calculated. Using the relative delays and magnitudes of the peaks, an estimate of the MMDS can be calculated.

In general, it is often the case that frequency-domain techniques for determining (e.g., estimating) the delay spread are used for multicarrier contexts such as OFDM. In multicarrier modulations, information is transmitted by multiple low-rate carriers, called subcarriers, spread over frequency. Pilot symbols (e.g., unicast reference signals or MBSFN reference signals in the example context of LTE) are placed in selected subcarriers to aid in estimation of the channel response across frequency and time. The pilot symbol locations (i.e., frequency and time) and their values (i.e., magnitude and phase) are known by both the transmitter and receiver. At the receiver, a received signal is converted from the time domain to the frequency domain. The magnitude and phase values of the pilot-symbol subcarriers are extracted from the received signal. Having knowledge of the transmitted pilot symbols, the receiver can remove from the received pilot symbols the components of the magnitude and phase that are due to the transmitted pilot symbols. This results in an estimate of the channel response with respect to the pilot-symbol subcarriers.

Using estimation techniques with the channel-response estimates at the pilot-symbol subcarriers, the receiver can determine the channel response at subcarriers that do not contain pilot symbols. This provides the receiver with an estimate of the channel response over the entire signal bandwidth. For an SFN-multicast transmission, the response over frequency will have peaks and valleys. The extent of the peaks and the depths of the valleys, as well as their locations (i.e., the subcarriers in connection with which they occur) are a function of the MMDS. From those peaks and valleys, the MMDS can be estimated.

Moreover, another option is to use a hybrid time-domain-and-frequency-domain technique for determining (e.g., estimating) the MMDS. According to an example hybrid technique, pilot symbols (e.g., MBSFN-reference symbols) are used to estimate the channel response over frequency as described above. To estimate the MMDS, the channel response is converted to the time domain (using, e.g., an inverse fast Fourier transform (IFFT)). The time-domain response will show the signal peaks and magnitudes much like the cross-correlation technique. The MMDS can be estimated from the peaks and magnitudes of the time-domain response.

In at least one correlation-peaks embodiment, the set of known reference signals includes a respective unicast reference signal from each site in the plurality of sites that comprise an SFN-multicast (e.g., MBSFN) area. As mentioned above, in this disclosure, the term "unicast-reference-signal embodiment" is used as shorthand for such embodiments.

In at least one unicast-reference-signal embodiment, each obtained correlation sequence (e.g., correlation sequences 902-906) comprises a respective maximum peak (e.g., peaks 912-916 respectively). It at least one such embodiment, locating the set of peaks comprises locating the respective maximum peak in each obtained correlation sequence, i.e., the peaks 912-916 in FIG. 9. It at least one further embodiment, the process further comprises discarding at least one located maximum peak that does not exceed a correlation threshold prior to calculating the MMDS. For example, if the correlation threshold is 0.75 and peaks 912-916 are 0.9, 0.7, and 0.8 respectively, then the peak 914 could be discarded prior to calculating the MMDS. In at least one other further embodiment, the process further comprises discarding at least one located maximum peak that corresponds to a point in time of the MBSFN transmission that does not exceed a power threshold prior to calculating the MMDS. For example, if the peak 912 corresponds to a point in time of the MBSFN transmission that does not exceed the power threshold, then the peak 914 could be discarded prior to calculating the MMDS.

In at least one embodiment, the SFN-multicast transmission is passed through an automatic gain controller prior to being used for generating correlation sequences.

In at least one unicast-reference-signal embodiment, the WCD identifies the respective unicast reference signals for inclusion in the set of known reference signals based at least in part on respective PIDs of the respective sites in the plurality of sites. In at least one such embodiment, the WCD identifies the respective PIDs of the respective sites in the plurality of sites at least in part by carrying out site searching and site reselection. In at least one other such embodiment, the process further comprises identifying the respective PIDs of the respective sites in the plurality of sites at least in part by receiving a list of the PIDs from a network.

For example, the WCD may attach to a particular site and deduce that site's PID from a primary synchronization signal and a secondary synchronization signal, using methods known by those with skill in the relevant art. Once the particular site's PID is deduced, the WCD may use this reference signal for timing purposes when receiving a MBSFN transmission that includes an MBSFN-transmission signal from that particular site. This may be done for all sites in the given MBSFN area.

In further detail, and again using LTE and MBSFN by way of illustration, during site search, a WCD needs to detect both of what are known as the Primary and Secondary Synchronization Sequences to determine the PID. The WCD then needs to decode the Broadcast Control Channel (BCCH) to determine the MBSFN Area ID(s) assigned to the eNodeB. The WCD maintains a mapping between PIDs and MBSFN Area ID(s) of each eNodeB that it scans. The WCD then uses this mapping to determine the plurality of eNodeBs that make up the MBSFN Area(s) served by the attached eNodeB. The WCD uses the PIDs of the eNodeBs that make up the MBSFN Area(s) to determine the synchronization sequences to use for generating the correlation and thus MMDS using time-domain, frequency-domain, and/or hybrid delay-spread estimation techniques.

Figure 10:
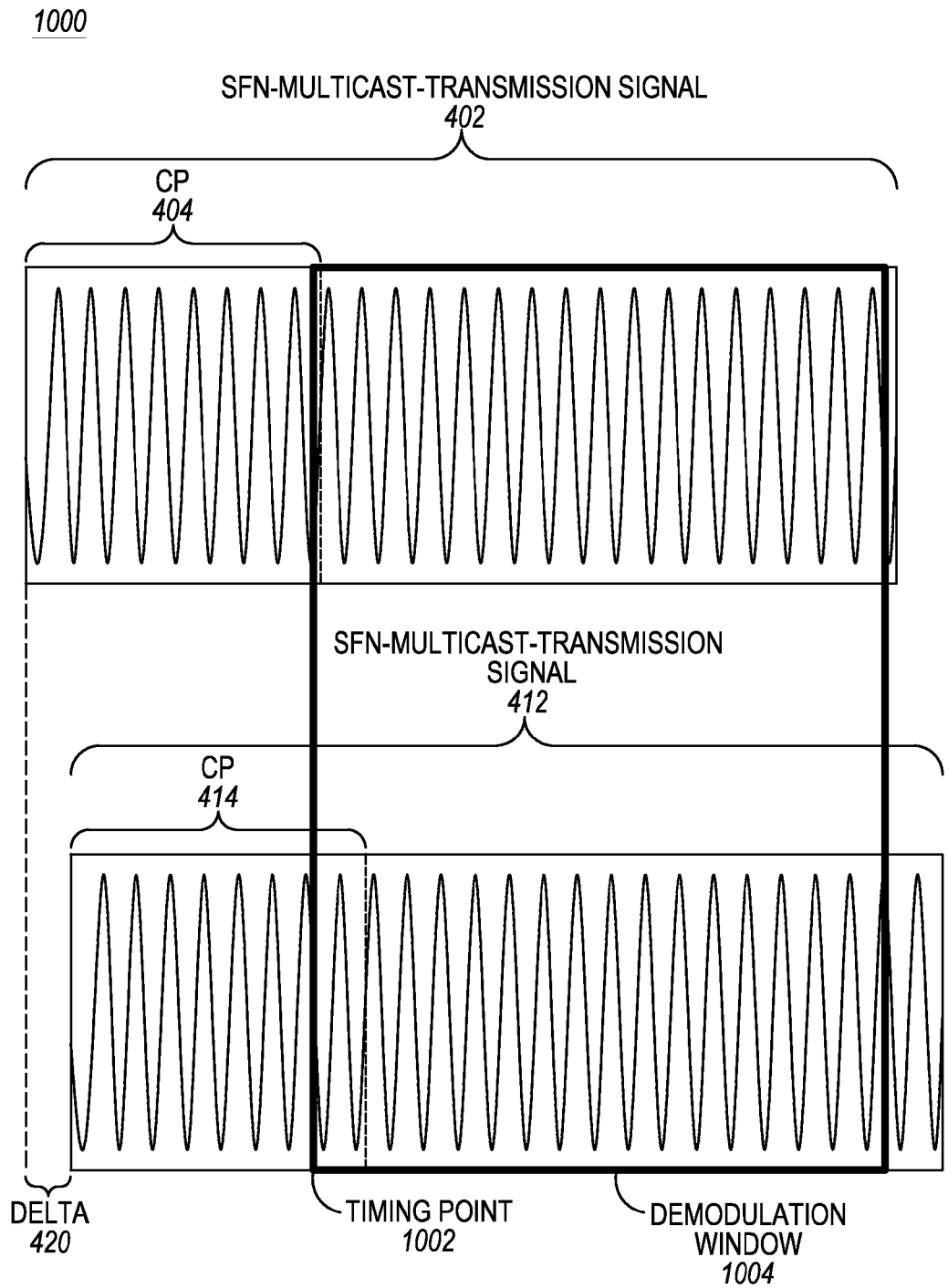
FIG. 10 depicts a first example demodulation window overlaid on the first example set of SFN-multicast-transmission signals of FIG. 4, in accordance with an embodiment.

FIG. 10 depicts a demodulation window overlaid on the first example set of SFN-multicast-transmission signals of FIG. 4, in accordance with an embodiment. In particular, FIG. 10 is a depiction 1000 that includes a demodulation window 1004 for the first example set 400 of SFN-multicast-transmission signals of FIG. 4. In FIG. 10, an SFN-multicast timing point 1002 defines the start of the demodulation window 1004. FIG. 10 helps illustrate which elements of each of the SFN-multicast-transmission signals 402 and 412 are used for demodulation. In one example, the timing point 1002 is determined to be the end of the CP 404. A demodulation window sets the range of in-phase/quadrature (IQ) samples from the received OFDM symbol (SFN-multicast (e.g., MBSFN) transmission) that are input into what is known as a fast Fourier transform (FFT) routine, where the output of the FFT routine is used to demodulate the OFDM symbol and determine the transmitted SFN-multicast (e.g., MBSFN) information.

Figure 11:
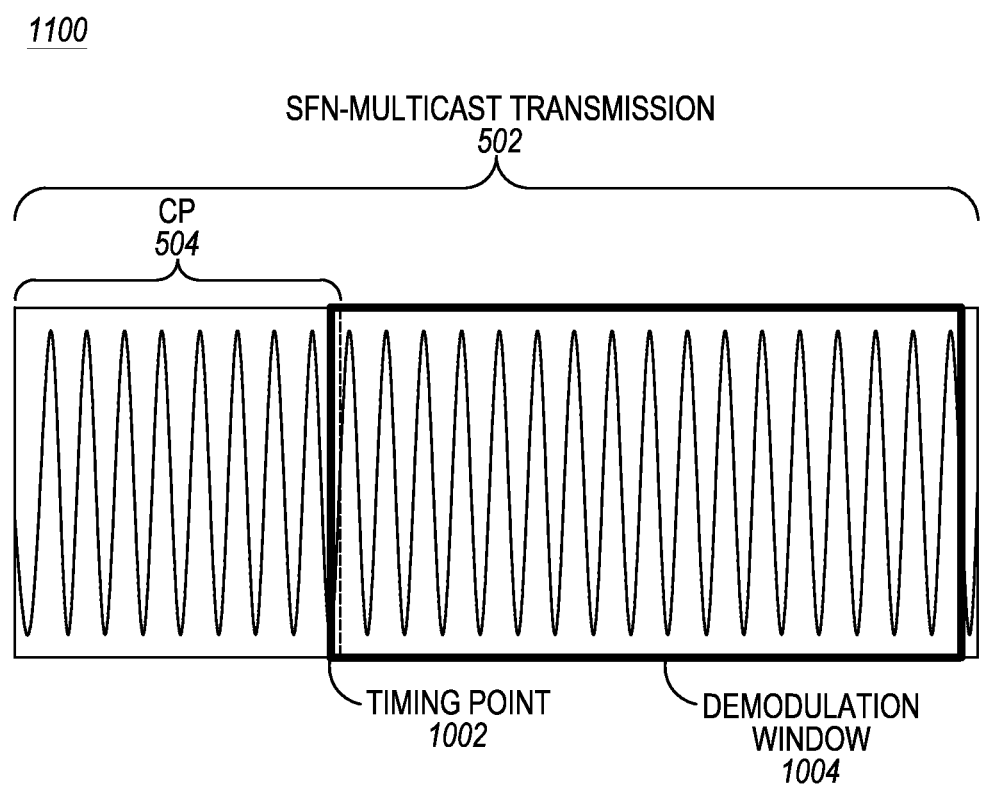
FIG. 11 depicts the first example demodulation window of FIG. 10 overlaid on the first example SFN-multicast transmission of FIG. 5, in accordance with an embodiment.

FIG. 11 is a depiction 1100 of the demodulation window 1004 of FIG. 10 overlaid on the first example SFN-multicast transmission 500 of FIG. 5, in accordance with an embodiment. In FIG. 11, as in FIG. 10, the timing point 1002 defines the start of the demodulation window 1004. FIG. 11 is provided to illustrate which elements of the SFN-multicast transmission 500 are used for demodulation when the calculated MMDS is determined to be less than the MMDS threshold. In one example, the timing point 1002 is determined to be the end of the CP 404. In one embodiment, the CP 504 is the CP of a first-received one of the SFN-multicast-transmission signals.

Figure 12:
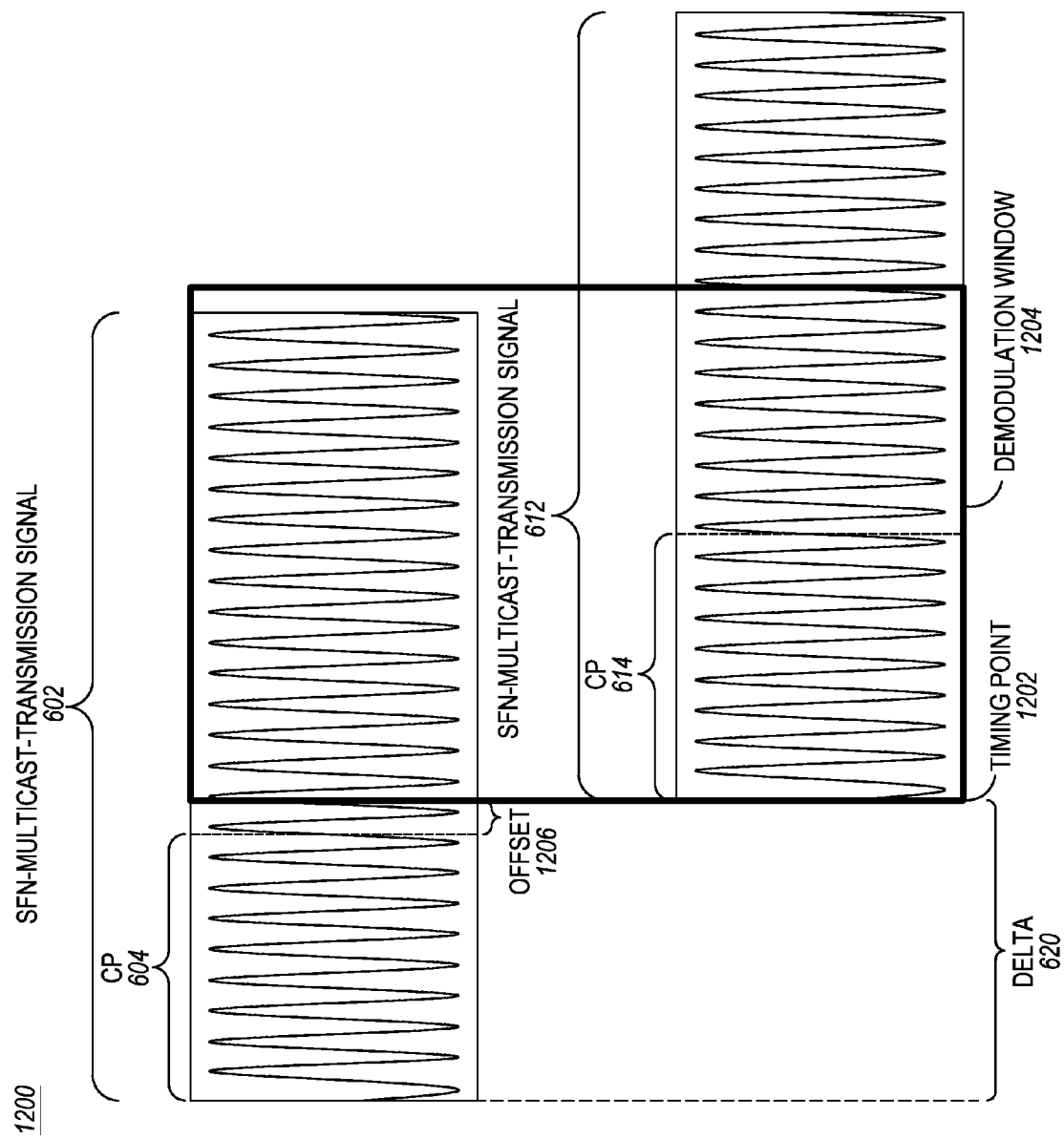
FIG. 12 depicts a second example demodulation window overlaid on the second example set of SFN-multicast-transmission signals of FIG. 6, in accordance with an embodiment.

FIG. 12 is a depiction 1200 of a demodulation window overlaid on the second example set of SFN-multicast-transmission signals of FIG. 6, in accordance with an embodiment. In particular, FIG. 12 depicts a demodulation window 1204 for the second example set 600 of SFN-multicast-transmission signals of FIG. 6. In FIG. 12, an SFN-multicast timing point 1202 defines the start of the demodulation window 1204. FIG. 12 helps illustrate which elements of each of the SFN-multicast-transmission signals 602 and 612 are used for demodulation. Specifically, it shows which samples from the received OFDM symbols carrying the SFN-multicast information are used in the FFT, the output of which is used for demodulation. In one example, the timing point 1202 is determined to be the end of the CP 604 plus a multicast-timing-point offset. This offset is depicted at reference numeral 1206 in both FIG. 12 and FIG. 13.

Figure 13:
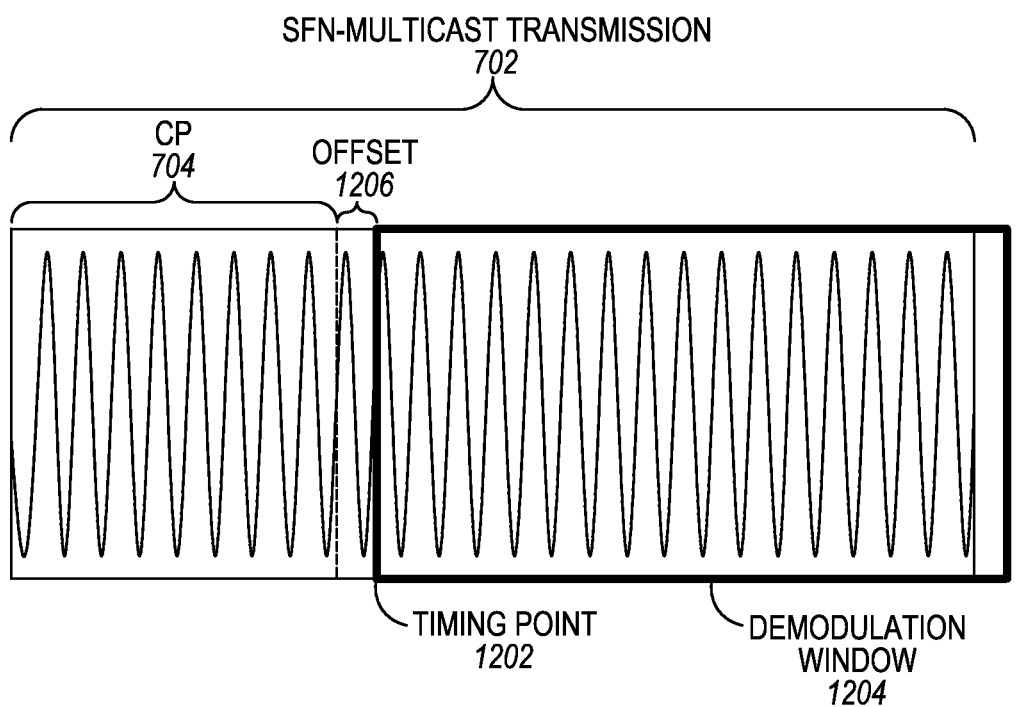
FIG. 13 depicts the second example demodulation window of FIG. 12 overlaid on the second example SFN-multicast transmission of FIG. 7, in accordance with an embodiment.

FIG. 13 is a depiction 1300 of the demodulation window 1204 of FIG. 12 overlaid on the second example SFN-multicast transmission 700 of FIG. 7, in accordance with an embodiment. In FIG. 13, the timing point 1202 (which is located at the multicast-timing-point offset 1206 after the end of the CP 704) defines the start of the demodulation window 1204. FIG. 13 is provided to illustrate which elements of the MBSFN transmission 700 are used for demodulation when the calculated MMDS is determined to be greater than the MMDS threshold.

In the depicted embodiment, as stated, the timing point 1202 is determined to be the end of the CP 704 plus the multicast-timing-point offset 1206. In one embodiment the CP 704 is the CP of a first-received MBSFN transmission signal, in this example this is the CP 604. The multicast-timing-point offset 1206 may be based on the calculated MMDS and a multiplier, as described above. The multiplier may be based on an estimated channel condition, as also described above. In one embodiment, the multicast-timing-point offset 1206 is the product of the selected multiplier and the estimated (i.e., calculated) MMDS. It is further noted that, in at least one embodiment, the selected timing point (e.g., the example timing point 1202 that is depicted in FIG. 12 and FIG. 13) results in a demodulation window that includes IQ samples from a subsequent OFDM symbol, which in turn results in ISI due to multisource transmission.

Figure 14:
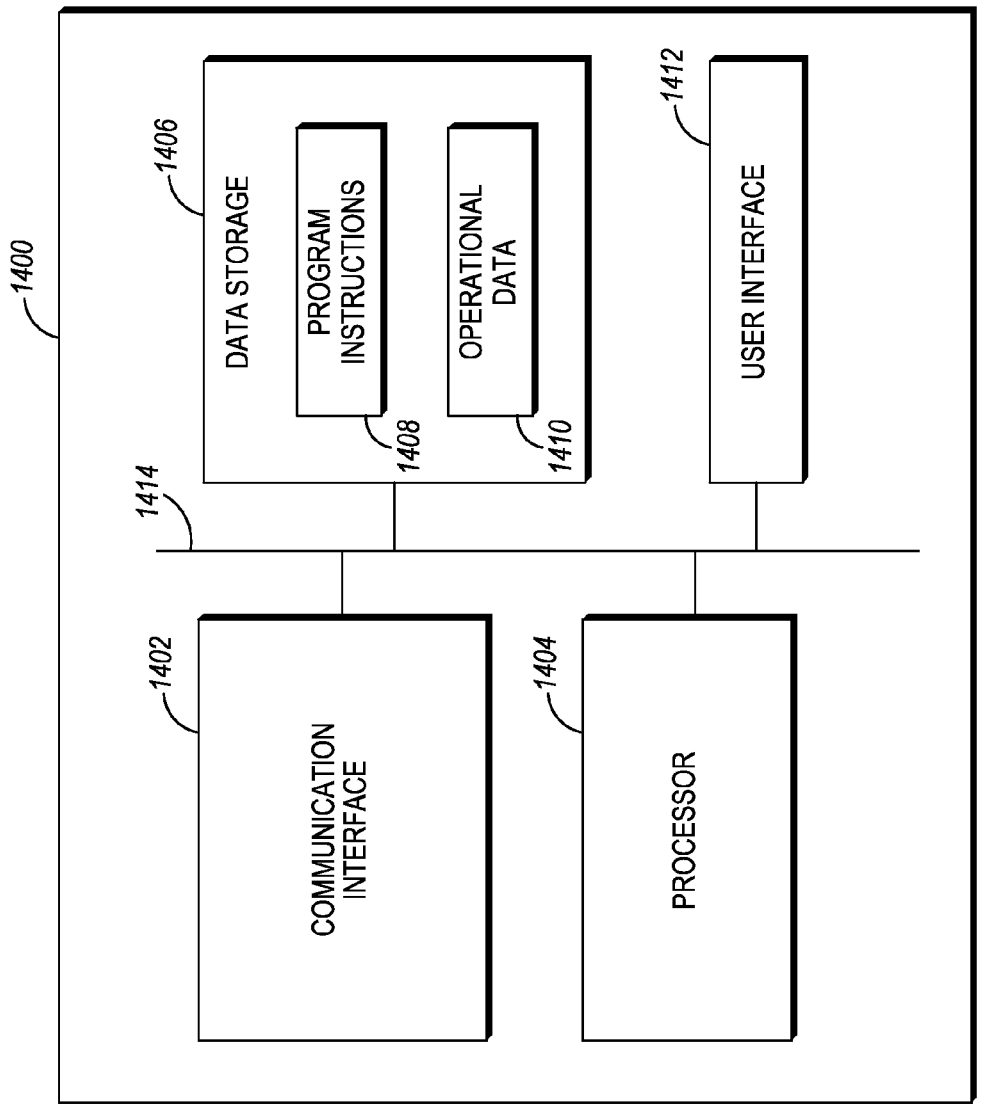
FIG. 14 depicts an example computing and communication device (CCD), in accordance with an embodiment.

FIG. 14 depicts an example computing and communication device (CCD), in accordance with an embodiment. At least one embodiment takes the form of a system that includes a communication interface, a processor, data storage containing instructions executable by the processor for causing the system to carry out a set of functions, and an optional user interface. The set of functions includes receiving an SFN-multicast transmission at least in part by receiving a respective SFN-multicast-transmission signal from each site in a plurality of sites in a given SFN-multicast area. Each received SFN-multicast-transmission signal has a respective SFN-multicast cyclic prefix. The set of functions also includes calculating an MMDS that is characteristic of the received plurality of SFN-multicast-transmission signals. The set of functions also includes determining whether the calculated MMDS exceeds an MMDS threshold. The set of functions also includes selecting a multicast timing point that is (i) after the SFN-multicast cyclic prefix of a first-received one of the received SFN-multicast-transmission signals responsive to determining that the calculated MMDS exceeds the MMDS threshold or (ii) within the SFN-multicast cyclic prefix of the first-received SFN-multicast-transmission signal responsive to determining that the calculated MMDS does not exceed the MMDS threshold. The set of functions also includes using the selected multicast timing point to demodulate the received SFN-multicast transmission.

The example CCD 1400 is depicted as including a communication interface 1402, a processor 1404, a data storage 1406, and an optional user interface 1412, all of which are communicatively coupled with one another via a system bus (or other suitable connection, network, or the like) 1414. As a general matter, the example CCD 1400 is presented as an example system that could be programmed and configured to carry out the functions (such as the process 300) described herein.

The communication interface 1402 may include one or more wireless-communication interfaces (for communicating according to, e.g., LTE, Wi-Fi, Bluetooth, and/or one or more other wireless-communication protocols) and/or one or more wired-communication interfaces (for communicating according to, e.g., Ethernet, USB, and/or one or more other wired-communication protocols). As such, the communication interface 1402 may include any necessary hardware (e.g., chipsets, antennas, Ethernet cards, etc.), any necessary firmware, and any necessary software for conducting one or more forms of communication with one or more other entities as described herein. The processor 1404 may include one or more processors of any type deemed suitable by those of skill in the relevant art, some examples including a general-purpose microprocessor and a dedicated digital signal processor (DSP).

The data storage 1406 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 14, the data storage 1406 contains program instructions 1408 executable by the processor 1404 for carrying out various functions and operational data 1410. In an embodiment in which a computing system such as the example CCD 1400 is arranged, programmed, and configured to carry out processes such as the process 300 described herein, the program instructions 1408 are executable by the processor 1404 for carrying out those functions; in instances where other entities described herein have a structure similar to that of the example CCD 1400, the respective program instructions 1408 for those respective devices are executable by their respective processors 1404 to carry out functions respectively performed by those devices.

The optional user interface 1412 may include one or more input devices (a.k.a. components and the like) and/or one or more output devices. With respect to input devices, the optional user interface 1412 may include one or more touchscreens, buttons, switches, microphones, and the like. With respect to output devices, the optional user interface 1412 may include one or more displays, speakers, light emitting diodes (LEDs), and the like. Moreover, one or more components (e.g., an interactive touchscreen-and-display component) of the optional user interface 1412 could provide both user-input and user-output functionality. And certainly other user-interface components could be used in a given context, as known to those of skill in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing", or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a wireless-communication device (WCD), the method comprising:
    receiving a single-frequency-network-(SFN)-multicast transmission, wherein receiving the SFN-multicast transmission comprises receiving a respective SFN-multicast-transmission signal from each site in a plurality of sites in a given SFN-multicast area, each received SFN-multicast-transmission signal having a respective SFN-multicast cyclic prefix;
    calculating a multisource multipath delay spread ("MMDS") that is characteristic of the received plurality of SFN-multicast-transmission signals;
    determining whether the calculated MMDS exceeds an MMDS threshold;
    selecting a multicast timing point that is (i) after the SFN-multicast cyclic prefix of a first-received one of the received SFN-multicast-transmission signals responsive to determining that the calculated MMDS exceeds the MMDS threshold or (ii) within the SFN-multicast cyclic prefix of the first-received SFN-multicast-transmission signal responsive to determining that the calculated MMDS does not exceed the MMDS threshold;
    using the selected multicast timing point to demodulate the received SFN-multicast transmission;
    obtaining a respective correlation sequence for the SFN-multicast transmission with each reference signal in a set of known reference signals, wherein the set of known reference signals includes a respective unicast reference signal from each site in the plurality of sites, wherein each obtained correlation sequence comprises a respective maximum peak, wherein locating the set of peaks comprises locating the respective maximum peak in each obtained correlation sequence;
    locating a set of peaks in the set of obtained correlation sequences, wherein the WCD calculates the MMDS based at least in part on the located set of peaks; and
    discarding at least one located maximum peak that does not exceed a correlation threshold prior to calculating the MMDS.

2. The method of claim 1, wherein:
    the SFN-multicast transmission comprises a multicast-broadcast SFN (MBSFN) transmission;
    each respective SFN-multicast-transmission signal comprises a respective MBSFN-transmission signal;
    each respective SFN-multicast cyclic prefix comprises a respective MBSFN cyclic prefix; and
    the given SFN-multicast area comprises a given MBSFN area.

3. The method of claim 1, wherein the WCD uses a respective matched filter to obtain each respective correlation sequence.

4. The method of claim 1, wherein the WCD calculates the MMDS based at least in part on relative locations of an identified earliest peak and an identified latest peak.

5. The method of claim 1, further comprising identifying the respective unicast reference signals for inclusion in the set of known reference signals based at least in part on respective physical layer cell identifiers (PIDs) of the respective sites in the plurality of sites.

6. The method of claim 5, further comprising identifying the respective PIDs of the respective sites in the plurality of sites at least in part by carrying out site searching and site reselection.

7. The method of claim 5, further comprising identifying the respective PIDs of the respective sites in the plurality of sites at least in part by receiving a list of the PIDs from a network.

8. The method of claim 1, wherein the set of known reference signals consists of an SFN-multicast reference signal unique to the given SFN-multicast area.

9. The method of claim 8, wherein locating the set of peaks comprises locating a set of local maxima that exceed a correlation threshold.

10. The method of claim 1, wherein the MMDS threshold is based on an SFN-multicast-transmission-signal-cyclic-prefix length.

11. The method of claim 1, wherein the WCD determines that the calculated MMDS exceeds the MMDS threshold, and responsively selects the multicast timing point to be a multicast-timing-point offset after an end of the SFN-multicast cyclic prefix of the first-received SFN-multicast-transmission signal.

12. The method of claim 11, further comprising determining the multicast-timing-point offset based at least in part on an estimated channel condition and at least in part on the calculated MMDS.

13. The method of claim 12, wherein the WCD selects a multiplier based at least in part on the estimated channel condition, wherein the WCD determines the multicast-timing-point offset as a product of the selected multiplier and the calculated MMDS.

14. The method of claim 1, wherein the WCD determines that the calculated MMDS does not exceed the MMDS threshold, and responsively selects the multicast timing point to be within the SFN-multicast cyclic prefix of the first-received SFN-multicast-transmission signal.

15. The method of claim 14, wherein the WCD selects the multicast timing point based at least in part on (i) a unicast timing point associated with the first-received SFN-multicast-transmission signal and (ii) a difference between a unicast-cyclic-prefix length and an SFN-multicast-transmission-signal-cyclic-prefix length.

16. A wireless-communication device (WCD) comprising:
a wireless-communication interface;
a processor; and
data storage containing instructions executable by the processor for causing the WCD to carry out a set of functions, the set of functions comprising:
receiving, via the wireless-communication interface, a single-frequency-network-(SFN)-multicast transmission, wherein receiving the SFN-multicast transmission comprises receiving a respective SFN-multicast-transmission signal from each site in a plurality of sites in a given SFN-multicast area, each received SFN-multicast-transmission signal having a respective SFN-multicast cyclic prefix;
calculating a multisource multipath delay spread ("MMDS") that is characteristic of the received plurality of SFN-multicast-transmission signals;
determining whether the calculated MMDS exceeds an MMDS threshold;
selecting a multicast timing point that is (i) after the SFN-multicast cyclic prefix of a first-received one of the received SFN-multicast-transmission signals responsive to determining that the calculated MMDS exceeds the MMDS threshold or (ii) within the SFN-multicast cyclic prefix of the first-received SFN-multicast-transmission signal responsive to determining that the calculated MMDS does not exceed the MMDS threshold;
using the selected multicast timing point to demodulate the received SFN-multicast transmission;
obtaining a respective correlation sequence for the SFN-multicast transmission with each reference signal in a set of known reference signals, wherein the set of known reference signals includes a respective unicast reference signal from each site in the plurality of sites, wherein each obtained correlation sequence comprises a respective maximum peak, wherein locating the set of peaks comprises locating the respective maximum peak in each obtained correlation sequence;
locating a set of peaks in the set of obtained correlation sequences, wherein the WCD calculates the MMDS based at least in part on the located set of peaks; and
discarding at least one located maximum peak that does not exceed a correlation threshold prior to calculating the MMDS.

* * * * *